COLOR TELEVISION RECEIVER DEMODULATOR

Filed May 26, 1959 4 Sheets-Sheet 1

INVENTOR
HALVOR NYGARD
JAN JACOB VERSCHUUR
BY
Frank R. Jeffrey
AGENT

Oct. 3, 1961 H. NYGARD ET AL 3,003,024

COLOR TELEVISION RECEIVER DEMODULATOR

Filed May 26, 1959 4 Sheets-Sheet 2

INVENTOR
HALVOR NYGARD
JAN JACOB VERSCHUUR
BY
[signature]
AGENT

INVENTOR
HALVOR NYGARD
JAN JACOB VERSCHUUR
BY
AGENT

Oct. 3, 1961 H. NYGARD ET AL 3,003,024

COLOR TELEVISION RECEIVER DEMODULATOR

Filed May 26, 1959 4 Sheets-Sheet 4

INVENTOR
HALVOR NYGARD
JAN JACOB VERSCHUUR
BY
Frank R. Jeifari [signature]
AGENT United States Patent Office 3,003,024
Patented Oct. 3, 1961

3,003,024

COLOR TELEVISION RECEIVER DEMODULATOR

Halvor Nygard, Gaule, Sweden, and Jan Jacob Verschuur, Eindhoven, Netherlands, assignors to North American Philips Company, Inc., New York, N.Y., a corporation of Delaware Filed May 26, 1959, Ser. No. 815,907
Claims priority, application Netherlands June 20, 1958
8 Claims. (Cl. 178—5.4)

Figure 1:
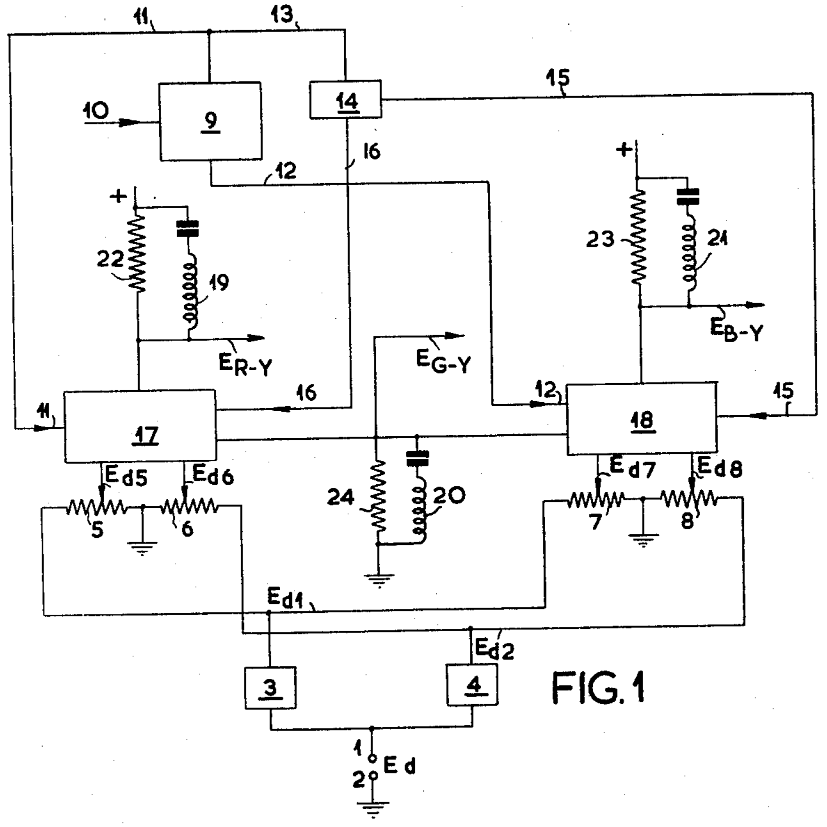

The present invention relates to receivers for use in color television systems, in which the transmitted television signal comprises a component essentially relating to the brightness of a scene and, moreover, a component made up of a sub-carrier wave modulated in quadrature with two signals, each of which consists of a given combination of signals relating to the color contents of the scene, which two first-mentioned signals of different band-widths are modulated on said sub-carrier wave, and the sub-carrier wave to be demodulated is supplied through two filters to a demodulator circuit, the first of which filters has a band-width substantially corresponding to that of one of the two combination signals, while the second filter has a band-width substantially corresponding to that of the other combination signal.

In a known system, the first-mentioned component, the brightness signal, consists of a combination of three signals, the first of which relates to the red, the second to the green and the third to the blue light components of the scene. The ratio in which these three signals are combined is such that the brightness signal substantially corresponds to a normal black-white television signal.

The two combination signals, the color signals, which are modulated in quadrature on the sub-carrier wave, likewise each consist of a given combination of three signals relating to the red, green and blue light components respectively, one of these combination signals is modulated on the sub-carrier wave with a band-width, at least with regard to one of the sidebands, exceeding that of the other. In the literature, the signal of greater band-width is often designated as the I-signal, the other as the Q-signal.

Conventional receivers for use in the aforesaid system may, for example, operate as follows:

After possible detection, in the case of wireless transmission, the brightness signal and the sub-carrier wave modulated in quadrature are available in the receiver.

The two components are supplied to two filter networks. The frequency characteristics of these filters are so chosen that at least the lower frequency components are filtered out, while one filter has a band-width corresponding to that of the Q-signal modulated according to the double sideband system, while that of the other filter is such as to correspond to the I-signal modulated partially according to the double sideband system and partially according to the single sideband system.

These filters are combined in such manner that the signals transmitted by one filter are shifted through an angle of +90° and through an angle of —90° respectively with regard to the signals transmitted by the other filter, subsequently to which the two phase-shifted signals are each individually added in a given ratio to the non-phase-shifted signal. The two signals thus obtained are subsequently applied to two synchronous demodulators. To these demodulators there are moreover supplied two oscillations with the frequency of the sub-carrier wave, which have no relative phase difference.

Since, after demodulation, given color difference signals are to ensure, the color of which greatly depends upon the ratio in which the divers signals are added together prior to demodulation, it will be evident that the size of the filters and their coupling is highly critical and that incorrect proportioning or coupling of these filters would involve color contamination, which should be corrected by separate means.

Therefore, in the system according to the invention, a demodulator circuit is employed instead of using said combined construction of the two filters, which demodulator circuit is characterized in that it comprises two demodulator stages each made up of two parts, while the output voltage derived from the first of the two filters is supplied in different ratios to a part of each of the two demodulator stages, while the output voltage derived from the second filter is likewise supplied in different ratios to the remaining parts of the demodulator stages, an oscillation derived from an oscillator operating at the frequency of the sub-carrier wave being supplied to each of the parts of the two demodulator stages with a phase suited to each of the parts.

Figure 2:
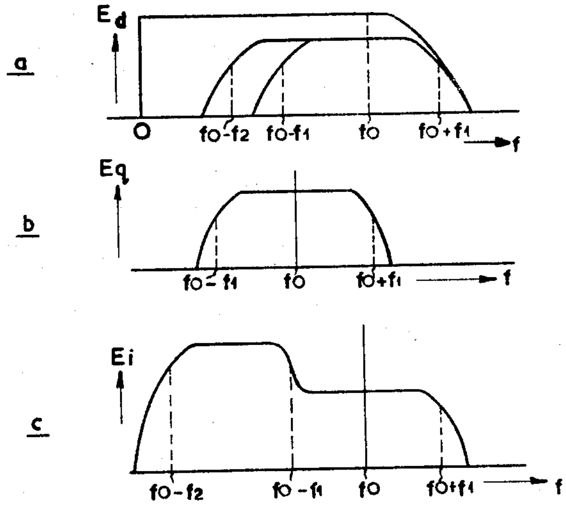
Figure 3:
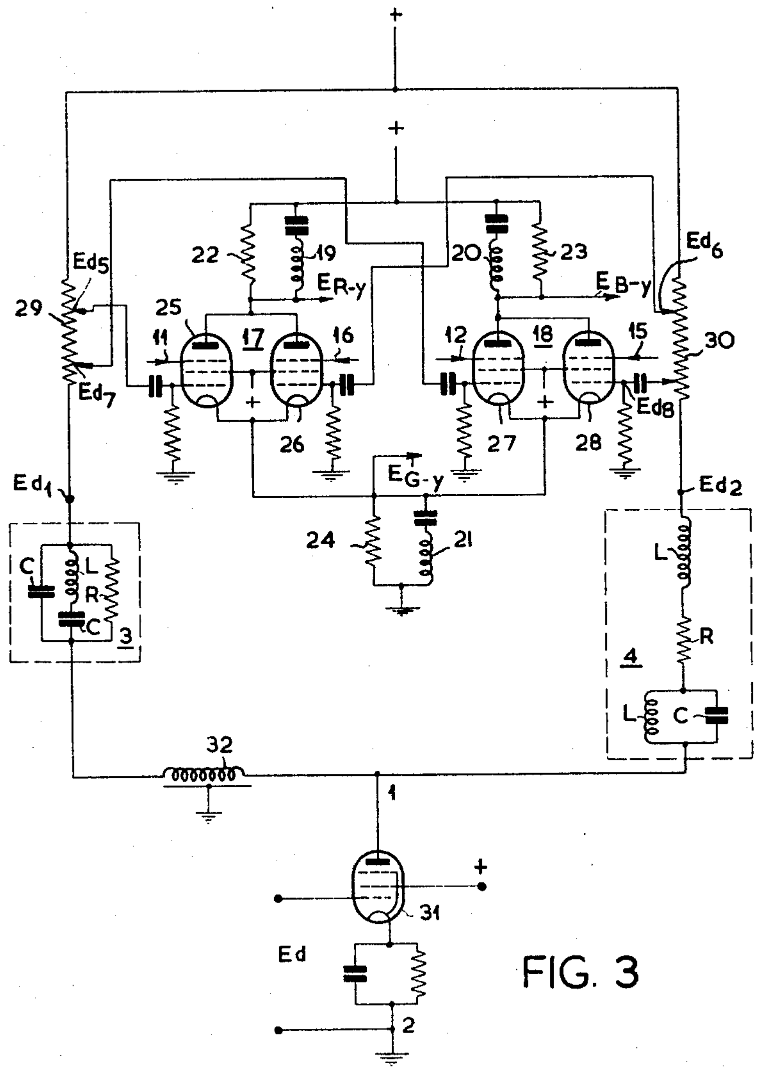
Figure 4:
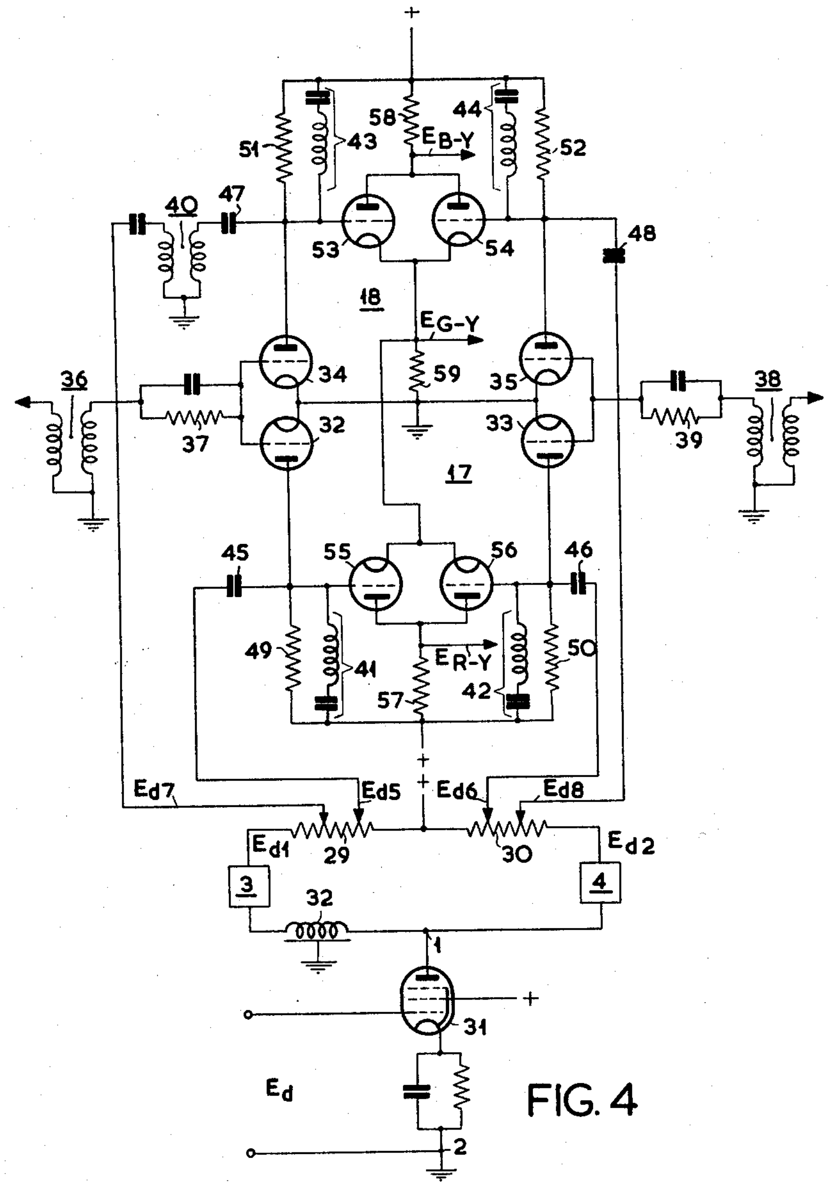
Figure 5:
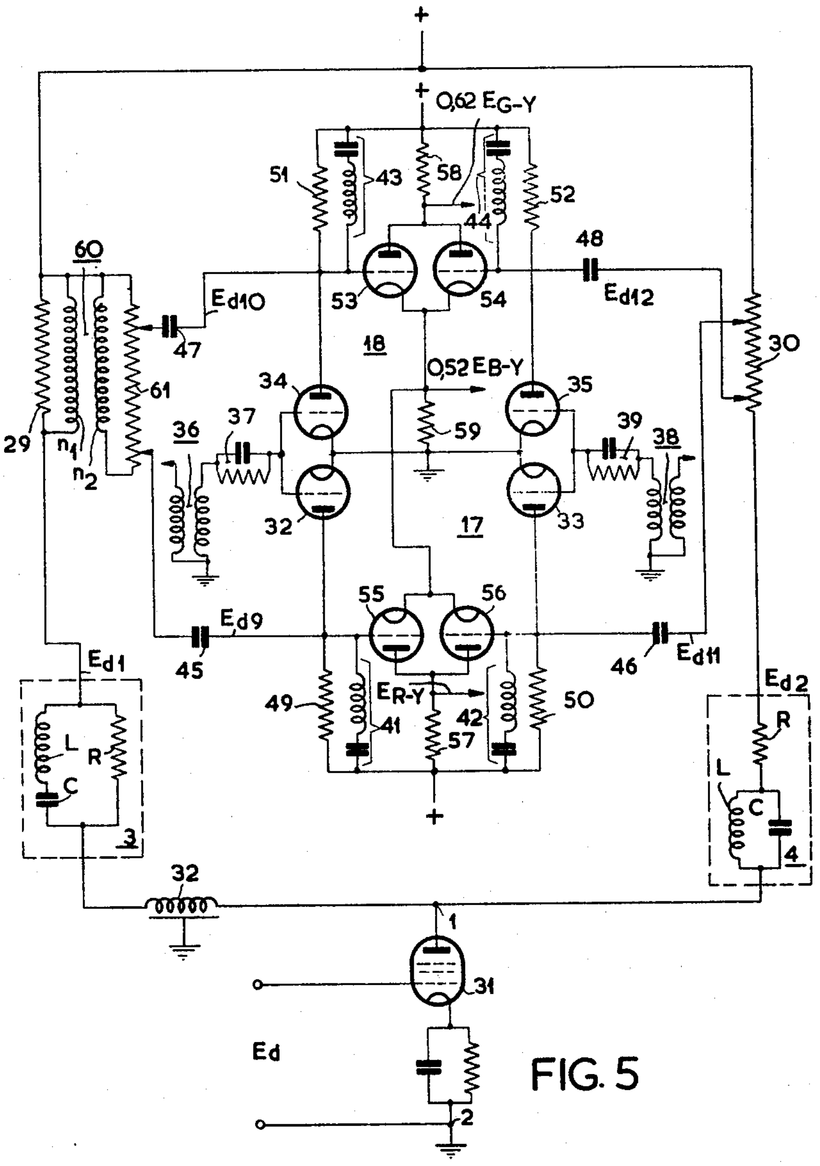

In order that the invention may be readily carried into effect, examples of circuit arrangements according to the invention will now be described in detail with reference to the accompanying drawings, in which FIG. 1 illustrates in block-schematic form the principle on which the circuit arrangement is based, FIG. 2 shows frequency characteristics, and FIGS. 3, 4 and 5 show detailed wiring diagrams.

In FIG. 1, the signal $E_d$ is applied to input terminals 1 and 2 of the circuit arrangement according to the invention.

Said signals $E_d$, when transmitting by wireless and receiving the television signal by means of a superheterodyne receiver, may be derived from the intermediate frequency detector.

For convenience, the indication known from the American N.T.S.C. system will hereinafter be used. Adoption of the principle set out in the present specification is, however, also possible for other coefficients of the composite color signals, when using a modulation system in which the two composite color signals are modulated on the color auxiliary carrier wave at an angle of 90° with regard to each other.

According to said N.T.S.C. system $E_d$ may be written:

$$E_d=Y+I\cos(\omega_0t+33°)+Q\sin(\omega_0t+33°)$$

where $\omega_0=2\pi f_0$ is the angular frequency of the color auxiliary carrier wave, Y represents the brightness signal, I represents the first composite color signal which may be written:

$$I=0.60R-0.28G-0.32B=0.74(R-Y)-0.27(B-Y)$$

and Q represents the second composite color signal $$Q=0.21R-0.52G+0.31B=0.48(R-Y)+0.41(B-Y)$$

In these last-mentioned expressions, R, G and B represent the red, green and blue components respectively.

From the aforesaid formulae it follows after calculation:

$$R-Y=0.96I+0.62Q \quad (1)$$

$$B-Y=-1.10I+1.70Q \quad (2)$$

$$G-Y=-0.51(R-Y)-0.19(B-Y) \quad (3)$$

which formulae, however, hold exactly only for the so-called low frequencies, since the bandwidth of the Q-signal is smaller than that of the I-signal.

The Q-signal may be thought to be made up of components of the form $$E_q.\sin(qt+\psi)$$

where $E_q$ represents the amplitude, $q$ represents the angular frequency $2\pi f$ and $\psi$ represents the phase angle of this signal. The frequency spectrum extends only over the frequency range of from 0 to $f_1$ c./s.

Similarly, the I-signal may be thought to be made up of components $$E_i \sin(it+\psi)$$

where $E_i$ represents the amplitude, $i$ represents the angular frequency $2\pi f$ and $\psi$ represents the phase angle respectively.

The frequency spectrum of this last-mentioned signal extends, however, over the frequency range of from 0 to $f_2$ c./s., where $f_2>f_1$.

The method of modulation is illustrated in FIG. 2*a*. The brightness signal Y occupies a frequency spectrum of from 0 to $(f_0+f_1)$ c./s., where $f_0$ represents the frequency of the color auxiliary carrier wave. The modulated Q-signal extends over a frequency range of $(f_0-f_1)$ c./s. to $(f_0+f_1)$ c./s. and is consequently normally modulated on the color sub-carrier wave according to the double sideband system.

In contradistinction thereto, the modulated I-signal extends from $(f_0-f_2)$ c./s. to $(f_0+f_1)$ c./s. Consequently, over the common I-Q-range, both of them are modulated according to the double sideband system, whereas over the range $(f_0-f_2)$ c./s. to $(f_0-f_1)$ c./s. the I-signal is modulated according to the single sideband system. The ranges referred to are not sharply defined as indicated by the frequencies. As is seen from FIG. 2*a* the ranges slightly overlap each other.

The data permit the signal $E_d$ to be written:

$$E_d=Y+\sum_{i=0}^{2\pi f_1}\frac{Ei}{2}[\sin\{(\omega_0+i)t+\psi+33°\}-\sin\{(\omega_0-i)t+33°-\psi\}]-\sum_{i=2\pi f_1}^{2\pi f_2}\frac{Ei}{2}\sin\{\omega_0-i)t+33°-\psi\}+\sum_{q=0}^{2\pi f_1}\frac{E_q}{2}[-\cos\{(\omega_0+q)t+\psi+33°\}+\cos\{(\omega_0-q)t+33°-\psi\}] \quad (4)$$

According to former methods, this signal may be applied to a demodulator permitting the I- and Q-signal to be rewon. In this case, the demodulated Q-signal moreover contains high-frequency components of the I-signal, which are filtered out by means of a separate filter incorporated in the Q-channel, which filter passes only frequencies of from 0 to $f_1$ c./s. Subsequently, these I- and Q-signals should be supplied to a matrix system satisfying the conditions determined by the Formulae 1, 2, 3.

The color difference signals $R-Y$, $B-Y$ and $G-Y$ delivered by this matrix system may each individually be applied to a control electrode of the red, the blue and the green gun of the picture tube, while the Y-signal is likewise applied to an other control electrode of each of the three guns. When using three picture tubes, the signals are applied to the three guns of the three picture tubes.

This principle can be greatly simplified when filtering of the high-frequency components is done not after, but before demodulation. This has the additional advantage that these filters for the higher frequencies around the color sub-carrier wave are easier to construct than when filtering occurs after demodulation. At the same time, that art of the matrix, which is determined by the coefficients of the Formulae 1 and 2 may directly be coupled to the filters. The phase-shift required in a normal matrix system for obtaining the $-1.10I$, the $-0.51(R-Y)$ and the $-0.19(B-Y)$ signal can be directly effected in the demodulator circuit.

A further advantage of this system is that it permits so-called high-level demodulation. Consequently, the required amplification can be effected in the intermediate-frequency part of the receiver and by an amplifier operating around the sub-carrier wave frequency $f_0$. The demodulator circuit may then be directly connected to the control electrodes of the three guns, thus rendering the use of separate direct current amplifiers or direct current component restorers superfluous.

Demodulators are known which demodulate at a high level not in the I- and Q-direction, but in the so-called $(R-Y)$- and $(B-Y)$-direction. If this occurs without the use of the further means, the high-frequency components should be filtered out radically, since otherwise there is crosstalk of information from the I-signal to information of the Q-signal.

This means that a part of the colour information of the I-signal is lost.

Moreover, a demodulator circuit referred to in the preamble is known, in which the high-frequency components of the I-signal are not wasted, it is true, but in which as a result of the complicated combination of the required filters not all of the aforesaid advantages can be realized.

According to the principle on which the invention is based two separate filters are used which, in combination with attenuators, exactly yield those signal voltages which, after demodulation in the I- and Q-direction, directly yield the required color difference signals with the associated higher frequency components in the correct ratios. For this purpose, the signal $E_d$ is on the one hand supplied to the filter 3 and on the other hand to the filter 4. The filter 3, together with the preceding intermediate-frequency filters, will have a frequency characteristic as shown in FIG. 2*c*. The rise of the pass-level in the range of from $(f_0-f_2$ c./s. to $(f_0-f_1)$ c./s is desired to give the amplitudes of the high-frequency components the correct values.

This will be explained hereinafter.

Disregarding in the first instance, the additional increase in amplitude due to the level variation of the frequency characteristic, the output signal of the filter 3 is $$E_{d1}=\sum_{i=0}^{2\pi f_1}\frac{E_i}{2}[\sin\{(\omega_0+i)t+\psi+33°\}-\sin\{(\omega_0-i)t+33°-\psi\}]-\sum_{i=2\pi f_1}^{2\pi f_2}\frac{E_i}{2}\sin\{(\omega_0-i)t+33°-\psi\}+\sum_{q=0}^{2\pi f_1}\frac{E_q}{2}[-\cos\{(\omega_0+q)t+33°+\psi\}+\cos\{(\omega_0-q)t+33°-\psi\}]$$

However, the filter 4 constitutes, likewise together with the preceding intermediate-frequency filters, a frequency characteristic shown in FIG. 2*b*. Hence, the output signal of this filter is:

$$E_{d2}=\sum_{i=0}^{2\pi f_1}\frac{E_i}{2}[\sin\{(\omega_0+i)t+\psi+33°\}-\sin\{(\omega_0-i)t+33°-\psi\}]+\sum_{q=0}^{2\pi f_1}\frac{E_q}{2}[-\cos\{(\omega_0+q)t+33°+\psi\}+\cos\{(\omega_0-q)t+33°-\psi\}]$$

These signals are supplied to potentiometers 5, 6, 7 and 8. The possibly variable tappings of the potentiometers are adjusted such that the output voltages at the tappings have the following values:

$$\left.\begin{matrix}E_{d5}=0.96\,K_1E_{d1}\\E_{d6}=0.62\,K_1E_{d2}\end{matrix}\right\}\text{coefficients determined by Equation 1}$$

$$\left.\begin{matrix}E_{d7}=1.10\,K_1E_{d1}\\E_{d8}=1.70\,K_1E_{d2}\end{matrix}\right\}\text{coefficients determined by Equation 2}$$

The constant $K_1$ is a multiplication factor smaller than unity to indicate the attenuation occurring in the circuit described.

The circuit arrangement moreover comprises an oscillator which is represented by a block 9. The color burst signal separated from the incoming television signal is supplied to said oscillator through the lead 10.

The oscillator is synchronized in known manner by means of said color burst signal and delivers to leads 11 and 12 signals.

$$E_{11}=\cos(\omega_0 t+33°)$$

and $$E_{12}=-\cos(\omega_0 t+33°)$$

The signal $E_{11}$ is likewise supplied, through a lead 13, to the phase-shifting network 14 so that the signals supplied through the leads 15 and 16 to demodulator stages 17 and 18 may be written $$E_{15}=E_{16}=\sin(\omega_0 t+33°)$$

It will be evident that the signal $E_{12}$ may also be derived through a phase-shifting network by which, for example, the signal $E_{11}$ is shifted in phase by 180°. Alternatively, the oscillator 9 may be caused to oscillate in adifferent phase and the signals $E_{15}$ and $E_{16}$ may be supplied directly, while the signals $E_{11}$ and $E_{12}$ may be supplied through a phase-shifting network.

Each of the demodulator stages 17 and 18 is made up of two parts, each of which acts as a synchronous demodulator. The output signals of the two synchronous demodulators of a demodulator stage are passed through a common impedance, subsequently to which the desired color difference directly ensues across said output impedance. This may be explained as follows:

The current through the left-hand part of 17 is given by:

$$I_{d5}=0.96K_1'E_{d1}\cos\{(\omega_0 t+33°)\}$$
$$=0.96K_1'\left[\sum_{i=0}^{2\pi f_1}\frac{E_i}{2}\sin(it+\psi)\sum_{i=2\pi f_1}^{2\pi f_2}\frac{E_i}{4}\sin(it+\psi)\right] \quad (5)$$

where the constant $K_1'$ has the dimension $R^{-1}$, in order to equalize the left-hand and right-hand terms of the Equation 5 and this constant depends upon the adjustment of the modulator stage 17. In the expression 5 the term with $2\omega_0 t$ are omitted, since these are filtered out by the filters 19 and 20. Hence, the current $I_{d5}$ will not produce output voltages having these frequencies across the output impedances. Similarly it is found:

$$I_{d6}=0.62K_1'E_{d2}\sin(\omega_0 t+33°)$$
$$=0.62K_1'\left[\sum_{q=0}^{2\pi f_1}\frac{E_q}{2}\sin(qt+\psi)\right] \quad (6)$$

$$I_{d7}=1.10K_1''E_{d1}\{-\cos(\omega_0 t+33°)\}$$
$$=-1.10K_1''\left[\sum_{1=0}^{2\pi f_1}\frac{E_i}{2}\sin(it+\psi)+\sum_{1=2\pi f_1}^{2\pi f_2}\frac{E_i}{4}\sin(it+\psi)\right] \quad (7)$$

$$I_{d8}=1.70K_1''E_{d2}\sin(\omega_0 t+33°)$$
$$=1.70K_1''\left[\sum_{q=0}^{2\pi f_1}\frac{E_q}{2}\sin(qt+\psi)\right] \quad (8)$$

Also in these formulae, the components with $2\omega_0 t$ have been omitted, since also in this case the filters 20 and 21 filter out these frequencies. $K_1''$ again serves to equalize the left-hand and right-hand terms of Equations 7 and 8 and depends upon adjustment of the demodulator stage 18.

From the Formulae 5 and 7 it follows that the higher frequency components have been attenuated to one half relatively to the low frequency components. As a matter of fact, the low components have amplitudes $$\frac{E_i}{2}$$

while the higher components have amplitudes $$\frac{E_i}{4}$$

Since the level of the characteristic shown in FIG. 2c in the frequency range $(f_0-f_2)$ c./s. to $(f_0-f_1)$ c./s. exceeds by 6 db that of the frequency range $(f_0-f_1)$ c./s. to $(f_0+f_1)$ c./s. the attenuation of ½, due to demodulation of the part of the I-signal modulated according to the single sideband modulation system, is exactly neutralized by the joint action of the filter 3 and of the intermediate-frequency circuits.

By raising the level in said frequency range, provision is made that the amplitudes of the obtained high frequency components have the correct values relative to those of the low frequency components.

Fully considering the operation of the filters and again adopting the general notation of the I- and Q-signal, the voltages across the output impedances 22 and 23 may be written as follows:

$$E_{22}=(Id_5+Id_6)R_{22}=\left\{0.96\sum_{1=0}^{2\pi f_1}I_1+0.62\sum_{q=0}^{2\pi f_1}Q_1+0.96\sum_{i=2\pi f}^{2\pi f_2}I_h\right\}\frac{K_1'}{2}\cdot R_{22}$$
$$=\left\{\sum_{0}^{2\pi f_1}(R-Y)_1+0.96\sum_{i=2\pi f_1}^{2\pi f_2}I_h\right\}\frac{K_1'}{2}\cdot R_{22} \quad (9)$$

where $I_1$ and $Q_1$ represent the low frequency components of the I- and Q-signal respectively, while $I_h$ designates the high components. Accordingly, $(R-Y)_1$ represents the low frequency components together forming this color difference signal. The demodulator stage 17 can be so adjusted that $$\frac{K_1'}{2}\cdot R_{22}=1$$

The voltage across 23 becomes:

$$E_{23}=(Id_7+Id_8)R_{23}=\left\{-1.10\sum_{1=0}^{2\pi f_1}I_1+1.70\sum_{1=2\pi f_1}^{2\pi f_1}I_h\right\}\frac{K_1''}{2}\cdot R_{23}$$
$$=\left\{\sum_{0}^{2\pi f_1}(B-Y)_1-1.10\sum_{i=2\pi f_1}^{2\pi f_2}I_h\right\}\frac{K_1''}{2}\cdot R_{23} \quad (10)$$

where $(B-Y)_1$ represents the low frequency components of this color difference signal. Also in this case, the demodulator stage 18 is set in such manner that $$\frac{K_1''}{2}\cdot R_{23}=1$$

It will be appreciated that, if a given amplification of the stages 17 and 18 is desired, the components $$\frac{K_1}{2}\cdot R_{22}$$

and $$\frac{K_1''}{2}\cdot R_{23}$$

may also be made to exceed unity.

Consequently, the Formulae 9 and 10 give the color difference signals for the lower frequencies and the associated I-signal for the higher frequencies according to the standards determined by the N.T.S.C. system.

In many receivers, operating according to the initial demodulation methods, the additional level increase of 6 db is not obtained. Therein the fact is put up with that the ratio between the amplitudes of the high frequency components of the signal according to the Equation 9 and those of the high frequency components of the signal according to the Equation 10 is correct. If desired, consequently, the filter 3 may alternatively be such that the frequency characteristic shown in FIG. 2c does not acquire an increase in level in said frequency range. This permits the construction of the filter 3 to be simplified.

The values of the resistors 22, 23 and 24 are found from the ratios $$R_{22}:R_{23}:R_{24}=1.96:5.26:1$$

These ratios have been calculated by means of the Equations 3, 9 and 10.

If a suitable value is chosen for anyone of these resistors, the other follow from the aforesaid ratios.

It will be evident that, if other ratios are desired between the colour difference signals, in connection with the difference in sensitivity of the phosphors on the screen of the picture tube, this is obtained in a simple manner by matching the ratios of the resistance $R_{22}$, $R_{23}$ and $R_{24}$ to these sensitivities. Moreover, it may be important to give the filter 3 only the desired frequency characteristic, but to incorporate in it, or elsewhere in the circuit associated with the filter 3, a delay circuit for delaying the signal $E_{d1}$ relatively to the signal $E_{d2}$ in connection with the difference in phase characteristic between the filters 3 and 4.

In FIG. 3, in which corresponding parts are provided with much the same reference numerals, the demodulator stage 17 is made up of two parts consisting of pentodes 25 and 26, while the demodulator stage 18 consists of pentodes 27 and 28.

Moreover, the potentiometers 5 and 7 are combined to form a potentiometer circuit 29, while potentiometers 6 and 8 constitute a potentiometer circuit 30. The filters 3, 4 and the potentiometer circuits 29, 30 connected in series therewith are inserted in the anode circuit of the amplifier tube 31, to the control grid of which the signal $E_d$ is applied. Moreover, the lead to the filter 3 comprises a delay circuit 32 for the required delay of the signal $E_{d1}$. The voltages $E_{d5}$ to $E_{d8}$ are applied to the first control grids of the pentodes 25 to 28, while the outputs of oscillator 9 are applied, either directly of through the phase-shifting network 14, to the third grids of these pentodes.

It is to be noted that, in this case, the choice of the resistor 24 is also determined by the desired value of the negative bias of the demodulator stages. If the value of 24 is fixed, the values of the resistors 22 and 23 follow from the aforesaid ratios.

Furthermore, this figure shows the construction of the filters 3 and 4. These are so-called reciprocal networks for which holds $$\frac{L}{C}=R^2$$

where L represents the value of the inductance, C represents the capacitance and R represents the resistance of the coils, capacitors and resistors used in these networks. When using these reciprocal networks, it may be necessary to take special steps for adequately attenuating the low frequency components of the Y-signal. For this purpose, for example, the control-grid circuit of the valve 31 may comprise a filter by which the frequencies of from 0 to $(f_0-f_2)$ c./s. are sufficiently attenuated.

FIG. 4 shows an example in which the demodulator stage 17 is made up of two parts consisting of tubes 32, 33, 55 and 56, while the demodulator stage 18 is likewise made up of two parts consisting of tubes 34, 35, 53 and 54. The triodes 32 to 35 act as so-called anode demodulator but these demodulate the voltages $E_{d5}$ to $E_{d8}$ supplied to their anodes only when the voltages applied to the control grids of these valves are released. To this end, a signal $$-\cos(\omega_0 t+33°)$$

is supplied to the transformer 36, which signal can be taken from the oscillator 9. This signal is reversed in phase by the transformer 36 and applied, through network 37, to the control grids of the tubes 32 and 34. By means of the network 37, such as negative bias is produced as a result of the grid current passing through it, that the peaks of the signal applied to the control grids produce anode current only during a small fraction of the time.

Similarly, a signal $$-\sin(\omega_0 t+33°)$$

is applied to the control grids of the tubes 33 and 35 through the transformer 38 and the network 39.

It is pointed out that, in this case, the phase of the voltage $E_{d7}$ is reversed in connection with the term of $-1.10I$ required according to Equation 2. For this purpose, the voltage $E_{d7}$ is applied through the transformer 40 to the anode of the tube 34. This transformer can be dispensed with if the signal $$-\cos(\omega_0 t+33°)$$

were taken from the primary of the transformer 36 and, through a separate network for producing the negative bias, supplied to the control grid of tube 34. The anodes of said triodes comprise filters 41 to 44 for filtering out the signals having frequencies of around $2f_0$. This mode of demodulation requires the use of separating tubes. As a matter of fact, the signals applied through supply capacitors 45 to 48 set up, across resistors 49 to 52, voltages by which the average voltages on the anodes of the triodes 32 to 35 are either made positive or negative to earth dependent upon the phase of the signal to be demodulated. These average voltages are the desired demodulation voltages which are held by supply capacitors 45 to 48 which, together with anode resistor 49 to 52, act as detection networks. At a given instant, the average voltage on the anode of tube 34 may, for example, happen to be negative, that of the tube 35 positive with respect to earth. It will be appreciated that the output voltages through the separator tubes 53 and 54 have to be combined, since otherwise undue interaction of the tubes 34 and 35 may occur.

Similarly, the output voltages of the valves 32 and 33 have to be combined by means of separating tubes 55 and 56. The resistors 57, 58 and 59 have the same function as the resistors 22, 23 and 24 shown in FIGS. 1 and 3 and can be calculated in the same manner.

FIG. 5 shows a circuit similar to that shown in FIG. 4, but the signal voltages applied to the demodulator stages 17 and 18 are attenuated in a manner different from that in the case shown in FIG. 4. The voltages applied to the anodes of valves 32 to 35 are now $$E_{d9}=1.53K_1E_{d1}$$
$$E_{d10}=0.40K_1E_{d1}$$
$$E_{d11}=-1.28K_1E_{d2}$$
$$E_{d12}=-0.26K_1E_{d2}$$

respectively.

Moreover, the construction of the filters 3 and 4 is slightly different from that shown in FIG. 3. However, these are likewise reciprocal networks for which $$\frac{L}{C}=R^2$$

applies. The choice of filters shown in FIG. 3 or in FIG. 5 is determined by the intermediate-frequency circuits used in the receiver and the high-pass filter used, as the case may be, in the control-grid circuit of the tube 31.

Since both $E_{d9}$ and $E_{d10}$ have to be reversed in phase, relatively to the voltages $E_{d11}$ and $E_{d12}$, a transformator 60 is connected to the resistor 29. This transformer is terminated by the potentiometer circuit 61 on its secondary side. This transformer permits the secondary voltage to be stepped up relatively to that on the primary winding, thus avoiding undue attenuation of the voltage $E_{d12}$. In the example shown in FIG. 5, the transformation ratio of 60 amounts to $$\frac{n_2}{n_1}=1.2$$

Also in this case, the transformer 60 and the potentiometer circuit 61 can be dispensed with if a signal $$\cos (\omega_0 t+33°)$$

be supplied to the transformer 36.

Moreover, as a result of the different values and phases of the voltages $E_{d9}$ to $E_{d12}$ with regard to the voltages $E_{d5}$ to $E_{d8}$, the color difference voltages supplied by the demodulator stages 17 and 18 are different from those produced in the circuits shown in FIGS. 3 and 4. Furthermore, the different sensitivities of the phosphors for reproducing the red, blue and green components have been considered.

For given phosphors, the voltages produced across the resistors 57, 58 and 59 are given below:

Voltage through $R_{57} \rightarrow (R-Y)$
Voltage through $R_{58} \rightarrow 0.62(G-Y)$
Voltage through $R_{59} \rightarrow 0.52(B-Y)$ This is obtained by giving the resistors 57, 58 and 59 such values as to obtain the following ratio:

$$R_{57}:R_{58}:R_{59}=0.725:0.227:1$$

It is to be noted that the aforesaid principle can also be carried through by deriving the signal $E_d$ not from the intermediate-frequency detector but directly from one of the last intermediate-frequency circuits of the receiver. In this case, the filters 3, 4 and the oscillator 9 should be matched to the frequency of the color sub-carrier wave at intermediate-frequency level. In this method, the Y-signal should be detected separately.

What is claimed is:

1. A receiver for color television signals of the type having a first component relating essentially to the brightness of a scene and a second component comprising a subcarrier wave modulated in quadrature with first and second signals relating to color content of the scene, said first and second signals having different bandwidths, said receiving comprising first filter means having a bandwidth substantially corresponding to the band of said first signal, second filter means having a bandwidth substantially corresponding to the bandwidth of said second signals, means apply said subcarrier wave to said first and second filter means, first and second demodulator means, a source of reference oscillations of the frequency of said subcarrier wave, phase shift means connected to said source for providing a plurality of reference oscillations of different phases, said demodulator means each comprising means for synchronously demodulating a pair of signals, means applying reference oscillations of two different phases to each of said demodulator means, means applying the output of said first filter means to said first and second demodulator means in different proportions for demodulation in each demodulator at the phase of one of the reference oscillations applied thereto, and means applying the output of said second filter means to said first and second demodulator means in different proportions for demodulation in each demodulator at the phase of the other reference oscillations applied thereto.

2. A receiver for color television signals of the type having a first component relating essentially to the brightness of a scene and a second component comprising a subcarrier wave modulated in quadrature by first and second color signals of different bandwidth, said receiver comprising a first filter means having a band-pass range corresponding to the band of said first signals, a second filter means having a band-pass range corresponding to the band of said second signals, means applying said first and second signals to said first and second filter means, first and second demodulator means, a source of reference oscillations of the frequency of said subcarrier wave, phase shift means connected to said source for providing a plurality of reference oscillations of different phases, each of said demodulator means comprising means for synchronously demodulating a pair of signals at different phases, means applying reference oscillations of two different oscillations to each of said demodulator means, first potentiometer means applying the output of said first filter means in different proportions to said first and second demodulator means for demodulation therein at the phase of one of the reference oscillations applied to each demodulator means, and second potentiometer means applying the output of said second filter means in different proportions to said first and second demodulator means for demodulation therein at the phase of the other reference oscillations applied to each demodulator means.

3. The circuit of claim 2, comprising an amplifying device having an input circuit and an output circuit, means applying said television signals to said input circuit, said output circuit comprising first and second parallel connected branches, said first branch comprising the series circuit of said first filter means and said first potentiometer means, said second branch comprising the series circuit of said second filter means and said second potentiometer means.

4. The receiver of claim 2, comprising means for combining the two outputs of each demodulator means.

5. A receiver for color television signals of the type having a first component relating essentially to the brightness of a scene and a second component comprising a subcarrier wave modulated in quadrature by first and second color signals of different bandwidth, said receiver comprising a first filter means having a band-pass range corresponding to the band of said first signals, a second filter means having a band-pass range corresponding to the band of said second signals, means applying said first and second signals to said first and second filter means, first and second demodulator means, a source of reference oscillations of the frequency of said subcarrier wave, phase shift means connected to said source for providing a plurality of reference oscillations of different phases, each of said demodulator means comprising a pair of multigrid electron discharge tubes each having a cathode, first and second control grids, and an anode, means applying reference oscillations of two different phases to the second control grids of the tubes of each demodulator means, means applying the output of said first filter means in different proportions to the first control grids of one discharge tube of each demodulator means, means applying the output of said second filter means in different proportions to the first control grids of the other discharge tube of each demodulator means, and a common impedance connected to the anodes of the discharge tubes of each said demodulator.

6. The receiver of claim 5, comprising a common cathode impedance connected to the cathodes of all of said discharge tubes.

7. A receiver for color television signals of the type having a first component relating essentially to the brightness of a scene and a second component comprising a subcarrier wave modulated in quadrature by first and second color signals of different bandwidth, said receiver comprising a first filter means having a band-pass range corresponding to the band of said first signals, a second filter means having a band-pass range corresponding to the band of said second signals, means applying said first and second signals to said first and second filter means, first and second demodulator means, a source of reference oscillations of the frequency of said subcarrier wave, phase shift means connected to said source for providing a plurality of reference oscillations of different phases, each of said demodulator means comprising first and second triodes and first and second separating tubes, means applying the output of said first filter means in different proportions to the anode of one triode of each demodulator means, means applying the output of said second filter means in different proportions to the anode of the other triode of each demodulator, means applying reference oscillations of different phase to the control grids of the triodes of each demodulator, means connecting the anode of each triode to the control grid of a separating tube, and common impedance means connected to the anodes and cathodes of the separating tubes of each demodulator means.

8. The receiver of claim 7, in which said four separating tubes have a common cathode impedance.

References Cited in the file of this patent

UNITED STATES PATENTS

| | | |
|---|---|---|
| 2,861,180 | Sonnenfeldt | Nov. 18, 1958 |
| 2,885,466 | Parmet | May 5, 1959 |